US009432716B2

(12) United States Patent
Liu

(10) Patent No.: US 9,432,716 B2
(45) Date of Patent: Aug. 30, 2016

(54) IN-VEHICLE DISPLAY FOR AUDIO-VIDEO DISTRIBUTION

(71) Applicant: Calvin Liu, City of Industry, CA (US)

(72) Inventor: Calvin Liu, City of Industry, CA (US)

(*) Notice: Subject to any disclaimer, the term of this patent is extended or adjusted under 35 U.S.C. 154(b) by 2 days.

(21) Appl. No.: 14/262,541

(22) Filed: Apr. 25, 2014

(65) Prior Publication Data

US 2014/0237518 A1 Aug. 21, 2014

Related U.S. Application Data

(63) Continuation-in-part of application No. 12/924,949, filed on Oct. 8, 2010, now Pat. No. 8,740,301.

(51) Int. Cl.
| H04N 7/16 | (2011.01) |
| H04N 7/18 | (2006.01) |
| H04N 21/414 | (2011.01) |
| H04N 21/436 | (2011.01) |
| H04H 20/62 | (2008.01) |
| B60N 2/48 | (2006.01) |
| B60R 11/02 | (2006.01) |
| B60R 11/00 | (2006.01) |

(52) U.S. Cl.
CPC ...... *H04N 21/41422* (2013.01); *B60N 2/4876* (2013.01); *B60R 11/0235* (2013.01); *H04H 20/62* (2013.01); *H04N 21/43615* (2013.01); *B60R 2011/0017* (2013.01); *B60R 2011/0045* (2013.01)

(58) Field of Classification Search
CPC .................. H04N 21/41422; H04N 20/62
USPC ..................................... 725/25, 75
See application file for complete search history.

(56) References Cited

U.S. PATENT DOCUMENTS

| 6,091,956 | A | 7/2000 | Hollenberg |
| 6,124,826 | A | 9/2000 | Garthwaite et al. |
| 6,182,006 | B1 | 1/2001 | Meek |
| 6,427,115 | B1 | 7/2002 | Sekiyama |
| 6,622,083 | B1 | 9/2003 | Knockeart et al. |
| 6,681,176 | B2 | 1/2004 | Funk et al. |
| 7,498,930 | B2 | 3/2009 | Phillips et al. |
| 7,597,393 | B1 | 10/2009 | Tuccinardi |
| 7,634,228 | B2 | 12/2009 | White et al. |
| 7,699,376 | B2 | 4/2010 | Vitito |
| 7,904,236 | B2 | 3/2011 | Ueno |
| 8,141,948 | B2 | 3/2012 | Cassellia et al. |
| 8,201,203 | B2 | 6/2012 | Vitito |
| 8,355,836 | B2 | 1/2013 | Silvester |

(Continued)

*Primary Examiner* — Pankaj Kumar
*Assistant Examiner* — Franklin Andramuno
(74) *Attorney, Agent, or Firm* — Hankin Patent Law APC; Jimmy Sauz; Kevin Schraven

(57) ABSTRACT

An in-vehicle display for audio-video distribution. The in-vehicle display may comprise a mounting arrangement and an entertainment system, wherein the entertainment system may further comprise: a housing, at least one display screen, a communication tool, and one or more connection modules. The mounting arrangement is generally configured to mount the entertainment system to a roof or headrest of a vehicle. The communication tool may be electrically connected to the display screen and may be configured to communicate with an external electronic device of a user via the connection modules, such that the communication tool links the display screen with the external electronic device in order to establish an interaction between the display screen and the external electronic device. Thus, user may be able to operate and control a digital content on the display screen through the external electronic device.

17 Claims, 10 Drawing Sheets

(56) References Cited

U.S. PATENT DOCUMENTS

| | | |
|---|---|---|
| 2001/0001319 A1 | 5/2001 | Beckert et al. |
| 2002/0137541 A1 | 9/2002 | Lepley et al. |
| 2002/0152027 A1 | 10/2002 | Allen |
| 2006/0123053 A1 | 6/2006 | Scannell |
| 2008/0163330 A1* | 7/2008 | Sparrell .............. H04M 11/007 725/142 |
| 2008/0252118 A1 | 10/2008 | Chang |
| 2008/0272634 A1 | 11/2008 | Vasquez et al. |
| 2009/0278390 A1 | 11/2009 | Carter |
| 2010/0198428 A1 | 8/2010 | Sultan |
| 2010/0238109 A1* | 9/2010 | Cook .................... G06F 3/0346 345/156 |
| 2011/0174926 A1* | 7/2011 | Margis ................ B60N 2/4876 244/118.6 |
| 2012/0162891 A1* | 6/2012 | Tranchina et al. ...... 361/679.26 |

\* cited by examiner

IN-VEHICLE DISPLAY FOR AUDIO-VIDEO DISTRIBUTION

CROSS-REFERENCE TO RELATED APPLICATIONS

This Application is a continuation-in-part of U.S. patent application Ser. No. 12/924,949, filed on Oct. 8, 2010, titled "Vehicle Seat Headrest With Built-In Communication Tool", by inventor Calvin Liu, the contents of which are expressly incorporated herein by this reference, and to which priority is claimed.

FIELD

The present disclosure relates generally to audio and video sharing technology devices, and, more particularly to an in-vehicle display for audio-video sharing from an independent or external electronic device.

BACKGROUND

Most conventional vehicles, such as cars, may be modified to include a liquid crystal display (LCD) screen or video monitor. Such display screens are generally located at the rear side of the headrest of the vehicle's seats and are generally used for entertainment purposes. Other vehicles, such as sport utility vehicles (SUV), trucks, and vans may also utilize a display screen, such as an overhead LCD screen attached to the roof of the vehicle, which is generally a retractable, flip-down monitor.

Many conventional vehicle LCD screens and video monitors, however, are either pre- and permanently-installed into the headrest of the car seat or are permanently attached to the roof of a vehicle, as an overhead monitor. These LCD screens generally lack many of the functionalities of LCD screens not installed into a vehicle. Specifically, these LCD screens, for example, may only display certain multimedia materials, such as movies retrieved from a predetermined multimedia player (e.g., built-in DVD player, portable DVD player). Thus, aside from playing movies from a single media source, most conventional LCD screens installed into vehicles lack many functions, such as wirelessly accessing the internet or connecting to a mobile computer or mobile phone.

Additionally, another disadvantage of existing in-vehicle LCD screens is that most LCD screens are inadequate to accommodate current entertainment or multimedia needs and/or abilities. In particular, most people generally have at least one portable communication or external electronic device, such as a cellular phone, smartphone, and/or laptop computer. When a person is sitting in a vehicle as a passenger, the existing LCD display simply cannot suit his or her needs and does not interact with the passenger's mobile devices. That passenger, for example, may want to utilize the in-vehicle LCD display to perform more tasks than just simply watching movies, such as playing music, browsing the Internet, or playing games.

Furthermore, users of the LCD screens may also want to utilize the screens to display the user's activity on his or her personal electronic communication device. For example, when a passenger wants to share a particular photo stored in his or her laptop computer or phone with other passengers, he or she may want to link the device with the in-vehicle LCD screen(s) so that every passenger sitting in the car can observe the photo simply by looking at the LCD screens positioned in front of them. Conventional in-vehicle LCD screens do not perform such a function.

Therefore, what is needed is an in-vehicle display for audio-video distribution, which resolves limitations in the prior art, including the foregoing deficiencies. The new in-vehicle display may comprise a vehicle monitor or display that connects with an independent computing device physically or wirelessly. Additionally, the in-vehicle display may show the activities performed by the user on the external electronic device, including displaying the desktop of the device.

SUMMARY OF THE INVENTION

To minimize the limitations in the prior art, and to minimize other limitations that will become apparent upon reading and understanding the present specification, the following discloses a new and improved in-vehicle display for audio-video distribution.

One embodiment may be an in-vehicle display for audio-video distribution, comprising: a mounting arrangement; and an entertainment system; wherein the entertainment system comprises: a housing, at least one display screen, a communication tool, and one or more connection modules; wherein the mounting arrangement is configured to mount the housing of the entertainment system to an interior portion of a vehicle; wherein the one or more connection modules are located within the communication tool of the entertainment system; wherein the communication tool is electrically connected to the at least one display screen; and wherein the communication tool of the entertainment system is configured to communicate with one or more external electronic devices of a user via the one or more connection modules, such that the communication tool links the at least one display screen with the one or more external electronic devices in order to establish an interaction between the at least one display screen and the one or more external electronic devices, such that the user is able to operate and control a digital content from the one or more external electronic devices on the at least one display screen through the one or more external electronic devices. The one or more connection modules may comprise an echo display module; wherein the echo display module may be configured to mirror the digital content displayed on the external electronic device of the user to the at least one display of the entertainment system. The one or more connection modules may comprise a wireless local area network module; wherein the wireless local area network module may be configured to wirelessly connect the entertainment system to an Internet, such that the user may be able to access the Internet through the entertainment system. The one or more connection modules may comprise a broadband wireless access module; and wherein the broadband wireless access module may be configured to wirelessly connect the entertainment system to a high speed Internet, such that the user may be able to access the high speed Internet through the entertainment system. The one or more connection modules may comprise a wireless personal area network module; and wherein the wireless personal area network module may be configured to wirelessly connect the external electronic device to the entertainment system, such that the user may be able to exchange data between the external electronic device and the entertainment system. The communication tool may comprise at least one universal serial bus connection port; and wherein the at least one universal serial bus connection port may be configured to facilitate a physical connection between the external electronic device and the entertainment system via the one or more connection modules. The entertainment system may further comprise a built-in multimedia player; and wherein the built-in multimedia player may be configured to process and play a multimedia material on the at least one display screen. The entertainment system may further comprise a storage device; wherein the storage device may comprise a predetermined amount of storage capacity for storing the digital content. The interior portion of a vehicle may be a roof interior; wherein the at least one display screen of the entertainment system may be an overhead flip-down monitor; and wherein the overhead flip-down monitor may be configured to attach to the roof interior of the vehicle. The entertainment system may further comprise a control panel; and wherein the control panel may be configured to allow the user to input one or more commands to control the entertainment system, the communication tool, and the external electronic device. The entertainment system may be a first entertainment system; wherein the in-vehicle display may further comprise a second entertainment system; and wherein the first entertainment system may be configured to wirelessly connect to the second entertainment system, such that, when the first entertainment system may receive the digital content contained in the external electronic device, the second entertainment system may also receive the digital content from the first entertainment system.

Another embodiment may be an in-vehicle display for audio-video distribution, comprising: a mounting arrangement; and an entertainment system; wherein the entertainment system comprises: a housing, at least one display screen, a communication tool, and one or more connection modules; wherein the mounting arrangement is configured to mount the housing of the entertainment system to a roof interior of a vehicle; wherein the one or more connection modules are located within the communication tool of the entertainment system; wherein the communication tool is electrically connected to the at least one display screen; and wherein the communication tool of the entertainment system is configured to communicate with an external electronic device of a user via the one or more connection modules, such that the communication tool wirelessly links the at least one display screen with the external electronic device in order to establish an interaction between the at least one display screen and the external electronic device, such that the user is able to operate and control a digital content on the at least one display screen through the external electronic device. The one or more connection modules may be selected from the group of connection modules consisting of: an echo display module; a wireless local area network module; and a broadband wireless access module; wherein the echo display module may be configured to mirror the digital content displayed on the external electronic device of the user to the at least one display of the entertainment system; wherein the wireless local area network module may be configured to wirelessly connect the entertainment system to an Internet, such that the user is able to access the Internet through the entertainment system; and wherein the broadband wireless access module may be configured to wirelessly connect the entertainment system to a high speed Internet, such that the user may be able to access the high speed Internet through the entertainment system. The entertainment system may further comprise a control panel; and wherein the control panel may be configured to allow the user to input one or more commands to control the entertainment system, the communication tool, and the external electronic device. The at least one display screen may be a touch-screen; and wherein the touch-screen may be configured to allow the user to control the control panel of the entertainment system and the external electronic device by touching predetermined positions on the display screen. The communication tool may comprise at least one universal serial bus connection port; and wherein the at least one universal serial bus connection port may be configured to facilitate a physical connection between the external electronic device and the entertainment system via the one or more connection modules. The entertainment system may further comprise a built-in multimedia player; and wherein the built-in multimedia player may be configured to process and play a multimedia material on the at least one display screen. The entertainment system may further comprise a storage device; wherein the storage device may comprise a predetermined amount of storage capacity for storing the digital content. The entertainment system may be a first entertainment system; wherein the in-vehicle display may further comprise a second entertainment system; wherein the first entertainment system may be configured to wirelessly connect to the second entertainment system, such that, when the first entertainment system may receive the digital content contained in the external electronic device, the second entertainment system may also receive the digital content from the first entertainment system.

Another embodiment may be an in-vehicle display for audio-video distribution, comprising: a mounting arrangement; and an entertainment system; wherein the entertainment system comprises: a housing, at least one display screen, a communication tool, one or more connection modules, a control panel, a built-in multimedia player, and a storage device; wherein the mounting arrangement is configured to mount the housing of the entertainment system to a roof interior of a vehicle; wherein the one or more connection modules are located in the communication tool of the entertainment system; wherein the communication tool is electrically connected to the at least one display screen; wherein the communication tool of the entertainment system is configured to communicate with an external electronic device of a user via the one or more connection modules, such that the communication tool links the at least one display screen with the external electronic device in order to establish an interaction between the at least one display screen and the external electronic device, such that the user is able to operate and control a digital content on the at least one display screen through the external electronic device; wherein the one or more connection modules comprise: an echo display module, a wireless local area network module, a broadband wireless access module, and a wireless personal area network module; wherein the echo display module is configured to mirror the digital content displayed on the external electronic device of the user to the at least one display of the entertainment system; wherein the wireless local area network module is configured to wirelessly connect the entertainment system to an Internet, such that the user is able to access the Internet through the entertainment system; wherein the broadband wireless access module may be configured to wirelessly connect the entertainment system to a high speed Internet, such that the user may be able to access the high speed Internet through the entertainment system; wherein the wireless personal area network module is configured to wirelessly connect the external electronic device to the entertainment system, such that the user is able to exchange data between the external electronic device and the entertainment system; wherein the control panel is configured to allow the user to input one or more commands to control the entertainment system, the communication tool, and the external electronic device; wherein the at least one display screen is a touch-screen; wherein the touch-screen is configured to allow the user to control the control panel of the entertainment system and the external electronic device by touching predetermined positions on the at least one display screen; wherein the communication tool comprises at least one universal serial bus connection port; wherein the at least one universal serial bus connection port is configured to facilitate a physical connection between the external electronic device and the entertainment system via the one or more connection modules; wherein the built-in multimedia player is configured to process and play a multimedia material on the at least one display screen; wherein the storage device comprises a predetermined amount of storage capacity for storing the digital content; wherein the at least one display screen of the entertainment system is an overhead flip-down monitor; and wherein the overhead flip-down monitor is configured to attach to the roof interior of the vehicle.

It is an object to provide an in-vehicle display that is configured to link to an external electronic device so that a user is capable of operating the external electronic device through the in-vehicle display and/or vice versa.

It is an object to provide an in-vehicle display that is configured to link to an external electronic device so that a user is capable of viewing on the in-vehicle display files, documents, photos, videos, games, and emails that are contained on or within the external electronic device.

It is an object to provide an in-vehicle display that is configured to electrically connect with a wide variety of external multimedia and/or electronic devices, so as to allow users to operate their own multimedia or electronic devices with the help of the display screen provided on the headrest.

It is an object to provide an in-vehicle display that may connect to a wide variety of multimedia or electronic devices in a wireless or wired manner, such that the in-vehicle display may display or play the audio, video, photo, gaming, communication, and/or work related content within the variety of multimedia or electronic devices.

It is an object of the present invention to overcome the limitations of the prior art.

Further objects and advantages will become apparent from a consideration of the ensuing description and drawings.

These and other objectives, features, and advantages will become apparent from the following detailed description, accompanying drawings, and appended claims.

Additional embodiments of the invention will be understood from the detailed description of the invention.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF THE ILLUSTRATIVE EMBODIMENTS

Figure 1:
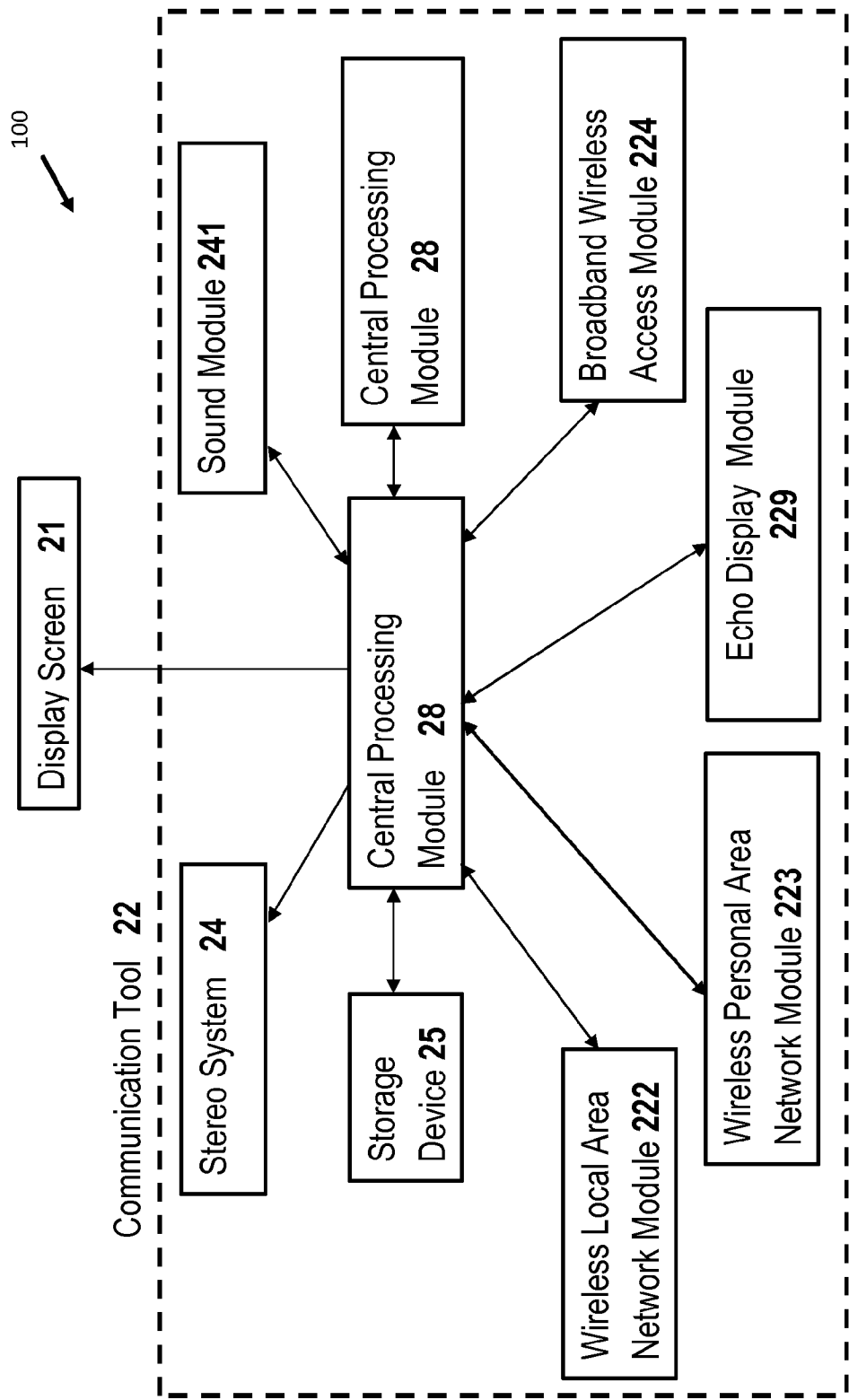
FIG. 1 is a block diagram of one embodiment of the in-vehicle display for audio-video distribution.

In the following detailed description of various embodiments, numerous specific details are set forth in order to provide a thorough understanding of various aspects of one or more embodiments. However, one or more embodiments may be practiced without some or all of these specific details. In other instances, well-known methods, procedures, and/or components have not been described in detail so as not to unnecessarily obscure aspects of the embodiments.

While multiple embodiments are disclosed, still others will become apparent to those skilled in the art from the following detailed description, which shows and describes illustrative embodiments. As will be realized, the various embodiments are capable of modifications in various obvious aspects, all without departing from the spirit and scope of the present disclosure. Accordingly, the illustrations, and the detailed descriptions thereof, are to be regarded as illustrative in nature and not restrictive. Also, the reference or non-reference to a particular embodiment shall not be interpreted to limit the scope of the disclosure.

Before the illustrative embodiments are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

In the following description, certain terminology is used to describe certain features of one or more embodiments. For example, as used herein, the terms "computer", "mobile computing device", "external electronic device", and "electronic data processing unit" generally refer to any device that processes information with an integrated circuit chip, including without limitation, mainframe computers, work stations, gaming consoles, servers, desktop computers, portable computers, laptop computers, and embedded computers. Furthermore, the terms "mobile computing device" and "external electronic device" may refer to any devices with wireless capabilities, including without limitation, cellular phones, tablet computers, personal digital assistants, digital media players, portable game players, and hand-held computers.

As used herein, the term "Internet" may refer to any collection of networks that utilizes standard protocols, whether Ethernet, Token ring, WiFi®, WiMax®, asynchronous transfer mode (ATM), Fiber Distributed Data Interface (FDDI), code division multiple access (CDMA), global systems for mobile communications (GSM), long term evolution (LTE), or any combination thereof.

As used herein, the terms "display" and "display screen" generally refer to any electronic output device for the visual presentation of digital content. The displays disclosed herein may utilize various screen technologies, including without limitation, liquid crystal display (LCD), light emitting diode (LED), thin-film transistor (TFT), and the like.

As used herein, the terms "application", "software", and "software application" generally refer to any set of machine-readable instructions on a client machine, web interface, and/or computer, downloadable or externally hosted, which directs a computer's processor to perform specific steps, processes, or operations disclosed herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary.

As used herein, the term "connection module" generally refers to any hardware or executable code that performs one or more functions that allows an electronic device or computer to exchange data or connect to the entertainment system disclosed herein or the Internet by utilizing one or more technologies, including without limitation, wireless local area network module (e.g., WiFi® technology), wireless personal area network module (e.g., Bluetooth® technology), broadband wireless access module (e.g., WiMax® technology), echo display module (e.g., Miracast® technology), and the like. The connection between the electronic device and the entertainment system (or Internet) may be performed wirelessly or physical connection.

It should also be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or multiple instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

The In-Vehicle Display for Audio-Video Distribution

The present specification discloses an in-vehicle display for audio-video distribution. The in-vehicle display may comprise a mounting arrangement and an entertainment system, wherein the entertainment system may further comprise: housing, display screen, communication tool, and one or more connection modules. The mounting arrangement may be configured to mount the entertainment system to a roof of a vehicle. The communication tool may be electrically connected to the at least one display screen and may be configured to communicate with one or more external electronic devices of a user via the connection modules, such that the communication tool links the at least one display screen with the external electronic device in order to establish an interaction between the display screen and the external electronic device, such that the user is able to operate and control digital content on the display screen through the external electronic device.

FIG. 1 is a block diagram of one embodiment of the in-vehicle display for audio-video distribution. As shown in FIG. 1, one embodiment of the in-vehicle display for audio-video distribution 100 may comprise: a display screen 21, communication tool 22, stereo system 24, storage device 25, built-in multimedia player 27, central processing module 28, wireless local area network module 222, wireless personal area network module 223, broadband wireless access module 224, echo display module 229, and sound module 241. The display screen 21 may be any electronic output device for the visual presentation of digital content and may utilize various screen technologies such liquid crystal display (LCD), light emitting diode (LED), thin-film transistor (TFT), and the like. The display screen 21 may also be a touch screen with touch sensitive controls and may further comprise an LED backlit panel for exceptional picture quality, high efficiency, and long life. In one embodiment, the display screen may be a 9" (16:9) TFT LD display with a resolution of 800×480 and brightness of 400 cd/m$^2$.

The communication tool 22 may be electrically connected with the display screen 21, and may be configured to electrically communicate with external electronic devices such that the communication tool 22 may electrically link the display screen 21 with one or more external electronic devices 80, 81, 82, 83 (shown FIGS. 2 to 9). The stereo system 24 is generally an audio device for audio presentation such as built-in speakers, and the storage device 25 is generally any device for storing digital or multi-media content and data. The built-in multimedia player 27 is generally used to process the multi-media content for the entertainment system and may be a DVD player in various embodiments.

The communication tool 22 may comprise: a central processing module 28, wireless local area network module 222, personal area network module 223, broadband wireless access module 224, echo display module 229, and sound module 241. The central processing module 28 may be used to carry out instructions of a computer program and may be configured to interact with the wireless local area network module 222, personal area network module 223, broadband wireless access module 224, or sound module 241. The wireless local area module 222 and broadband wireless access module 224 may be configured to wirelessly connect the entertainment system to the Internet, such that a user is able to access to the Internet through the entertainment system. A preferred embodiment of the wireless local area network module may utilize WiFi® technology to allow an electronic device to exchange data or connect to the internet wirelessly generally using 2.4 GHz UHF waves and 5 GHz SHF waves. An embodiment of the broadband wireless access module 224 may be WiMax® technology, which is generally a wireless protocol designed to provide high speed Internet with transfer data rates of over 100 megabit-per-second. The personal area network module 223 may be configured to wirelessly connect the external electronic device to the entertainment system, such that the user is able to exchange data between the external electronic device and the entertainment system within a short distance. An embodiment of the personal area network module may utilize Bluetooth® wireless technology in order to exchange data over short distances (using short-wavelength UHF radio waves in the ISM band from 2.4 to 2.485 GHz) from fixed and mobile devices.

The echo display module 229 may be configured to mirror or echo the digital content displayed on the external electronic device of the user to the display of the entertainment system. An embodiment of the echo display module may utilize Miracast® technology, which is generally a peer-to-peer wireless screencasting standard formed via Wi-Fi Direct® connections in a manner similar to Bluetooth®. The echo display module such as Miracast® generally enables wireless delivery of audio and video to or from desktops, tablets, mobile phones, and other devices.

The sound module 241 may be configured to generate audible sound and may utilize automatic loudness control (ALC) technology to address typical loudness problems, including audio jumps between programs and commercials, without adversely impacting the program content. The sound module 241 may also comprise of transmitters (e.g., FM transmitter).

The in-vehicle display may also comprise other components such as 35 mm audio jacks for headphones, A/N inputs (e.g., RCA input), wireless remote controls, and an infrared (IR) transmitter (e.g., Channel A: approximately 2.3 MHz (left) to 2.8 MHz (right); Channel B: approximately 3.2 MHz (left) to 3.8 MHz (right)).

In-Vehicle Display Configured for a Headrest of a Vehicle

Referring to FIGS. 2-5, a headrest for mounting on a vehicle seat 70 according to an embodiment is illustrated, in which the headrest may comprise a head pillow 10, and an entertainment system 20.

The head pillow 10 may comprise a pillow body 11 having a receiving cavity 12 formed at a rear side of the pillow body 11, and a mounting arrangement 30 extended from the pillow body 11 for mounting or connecting the head pillow 10 to the vehicle seat 70. In various embodiments, the mounting arrangement 30 may comprise adjustable poles approximately between 5¼" to 7¼" for universal fit of vehicle headrests. In other arrangements, the head pillow 10 may be permanently attached to the vehicle seat 70.

The entertainment system 20 may comprise at least one display screen 21 and a communication tool 22. The display screen 21 may be detachably mounted at the rear side of the pillow body 11 within the receiving cavity 12. In one embodiment, the in-vehicle display may comprise a free tilt mechanism to allow adjustment of the angle of the display screen 21 for optimal viewing.

The communication tool 22 may be electrically connected with the display screen 21, and may be configured to electrically communicate with one or more external electronic devices 80, 81, 82, 83 in such a manner that the communication tool 22 may be arranged to electrically link the display screen 21 with the external electronic device 80, 81, 82, 83 for establishing an interaction between the display screen 21 and the external electronic device 80, 81, 82, 83, such that a user may be able to operate and control the external electronic device 80, 81, 82, 83 on the display screen 21 through the communication tool 22. The connection may also allow the user to display content on or from the external electronic device 80, 81, 82, 83 on the display screen 21. In this manner, the user may share and view videos, photos, work related documents, slide shows, internet content, and even the desktop of the user's external electronic device 80, 81, 82, 83, on the display screen 21.

According to an embodiment, the head pillow 10 may be mounted onto the headrest portion of the vehicle seat 70 on a rear side thereof for displaying image to the passenger sitting behind the vehicle seat 70 on which the entertainment system 20 may be mounted. In other words, the user who actually accesses or watches the multimedia materials on the display screen 21 is typically the one who sits behind the vehicle seat 70.

The entertainment system 20 may comprise a housing 23, which may cover various colors and materials. The display screen 21 may comprise a LCD panel 211 having a light emitting diode (LED) backlit background and a touch-screen feature, which may fully support operation by physical touching of the user. In other words, the user may be capable of controlling both the entertainment system 20 and the external electronic device 80, 81, 82, 83 by simply touching predetermined positions on the LCD panel 211. The LCD panel 211 may be mounted onto the housing 23, which is itself then mounted onto the rear side of the pillow body 11 of the head pillow 10. Moreover, the communication tool 22 may be also supported on the housing 23 for communicating with the user.

The entertainment system 20 may further comprise a stereo system 24 provided on the housing 23, wherein the stereo system 24 may comprise a sound module 241 received in the housing 23, and a plurality of stereo speakers 242 also provided on the housing 23 for generating audible sound to an exterior thereof.

The entertainment system 20 may further comprise a storage device 25, which may be received in the housing 23, wherein the storage device 25 may have a predetermined amount of storage capacity for storing multimedia materials. The storage device 25 may be embodied as a flash memory hard drive, which may store a predetermined amount of video, game, photo, and/or music files. The multi-media files may then be played on the display screen 21.

The entertainment system 20 may further comprise a microphone 26 provided on the housing 23 for allowing users to input sound signal into the entertainment system 20. For example, the microphone 26 may be used to allow the user to enjoy karaoke and/or interactive gaming while traveling. The user's voice may then be delivered to other passengers through the stereo system 24.

The entertainment system 20 may further comprise a built-in multimedia player 27 provided on the housing 23 for processing multimedia materials and playing the multimedia materials on the display screen 21. The multimedia player 27 may be embodied as a DVD player. However, players for other types of multimedia materials, such as MP3s or CDs, may also be possible alternatives or additions to the DVD player. In other words, the built-in multimedia player 27 may be capable of playing at least one common multimedia material (such as movie files stored in DVDs), but the multimedia player 27 may be embodied as having the capability to play more than one type of multimedia material, such as music files stored on a CD.

The communication tool 22 may comprise at least one connection port, such as a universal serial bus (USB) connection port 221, provided on the housing 23 and/or otherwise connected to the display screen 21 for allowing the user to connect his or her external electronic device 80, 81, 82, 83 with the entertainment system 20 through the USB connection port 221. Thus, the user may bring his or her own external electronic device 80, 81, 82, 83 to the vehicle, such as an external hard drive containing movies or music files, and may connect the external hard drive to the entertainment system 20 through the USB connection port 221 and a USB enabled cable 228 so as to allow the display screen 21 and the stereo system 24 to play the multimedia materials contained in the external electronic device 80, 81, 82, 83 (e.g., music, image, and video playback). The display may automatically select between Phase Alternating Line (PAL) and Advanced Television System Committee (ATSC) standards.

The communication tool 22 may further comprise an echo display module 229 provided in the housing 23, wherein the echo display module 229 may be configured to enable wireless delivery of audio and/or video to or from one or more external electronic devices 80, 81, 82, 83, such as tablets, mobile phones, and other devices. The echo display module 229 generally allows users to, for example, echo a display from the external electronic device 80, 81, 82, 83 onto a display screen 21 in real-time, and watch live programs on the display screen 21. Thus, when the entertainment system 20 is connected to the external electronic device 80, 81, 82, 83, for example via Miracast®, a mirror image of the digital content displayed in the external electronic device 80, 81, 82, 83.

The communication tool 22 may further comprise a wireless local area module 222 provided in the housing 23, wherein the wireless local area module 222 may be configured to wirelessly connect to an external WiFi® network. When the entertainment system 20 may be connected to a WiFi® network through the wireless local area module 222, the user may be able to access to the Internet via the entertainment system 20.

The communication tool 22 may further comprise a wireless personal area network module 223, which may also be provided in the housing 23, wherein the wireless personal area network module 223 may be configured to wirelessly connect to the external electronic device 80, 81, 82, 83 through Bluetooth® technology. The entertainment system 20 and the external electronic device 80, 81, 82, 83 may then be able to exchange information in a wireless manner through Bluetooth® connection technology.

Furthermore, the communication tool 22 may further comprise a broadband wireless access module 224, which may also be provided in the housing 23, wherein the broadband wireless access module 224 may be arranged to wirelessly connect to the Internet network through a predetermined telecommunication protocol. The entertainment system 20 may then be able to gain mobile Internet access through the broadband wireless access module 224.

Moreover, the entertainment system 20 may further comprise a central processing module 28, which may be provided in the housing 23 and electrically connected to the communication tool 22, stereo system 24, storage device 25, microphone 26 and multimedia player 27 to control and coordinate the operation of each of these components. In addition, in order to facilitate control and interaction of the entertainment system 20 and external electronic device 80, 81, 82, 83, the entertainment system 20 may further comprise a control panel 29 electrically connected with the central processing module 28 for control of the various components mentioned above and to provide a platform for allowing the user to interact with the external electronic device 80, 81, 82, 83. The control panel 29 may be a physical control panel separately extended or part of the housing 23. On the other hand, the control panel 29 may be incorporated into the LCD panel 211 as soft keys so that the touch-screen feature of the LCD panel 211 may be used by the user for making inputting commands to control the entertainment system 20 or the external electronic device 80, 81, 82, 83. Alternatively, the user may control the operation of the external electronic device 80, 81, 82, 83 through its own control panel.

The operation of the illustrative embodiments for an in-vehicle display configured for a vehicle headrest may be elaborated under the following examples by illustrating the use of a different external electronic device 80, 81, 82, 83 and by referring to FIGS. 2 to 5.

EXAMPLE 1

Figure 2:
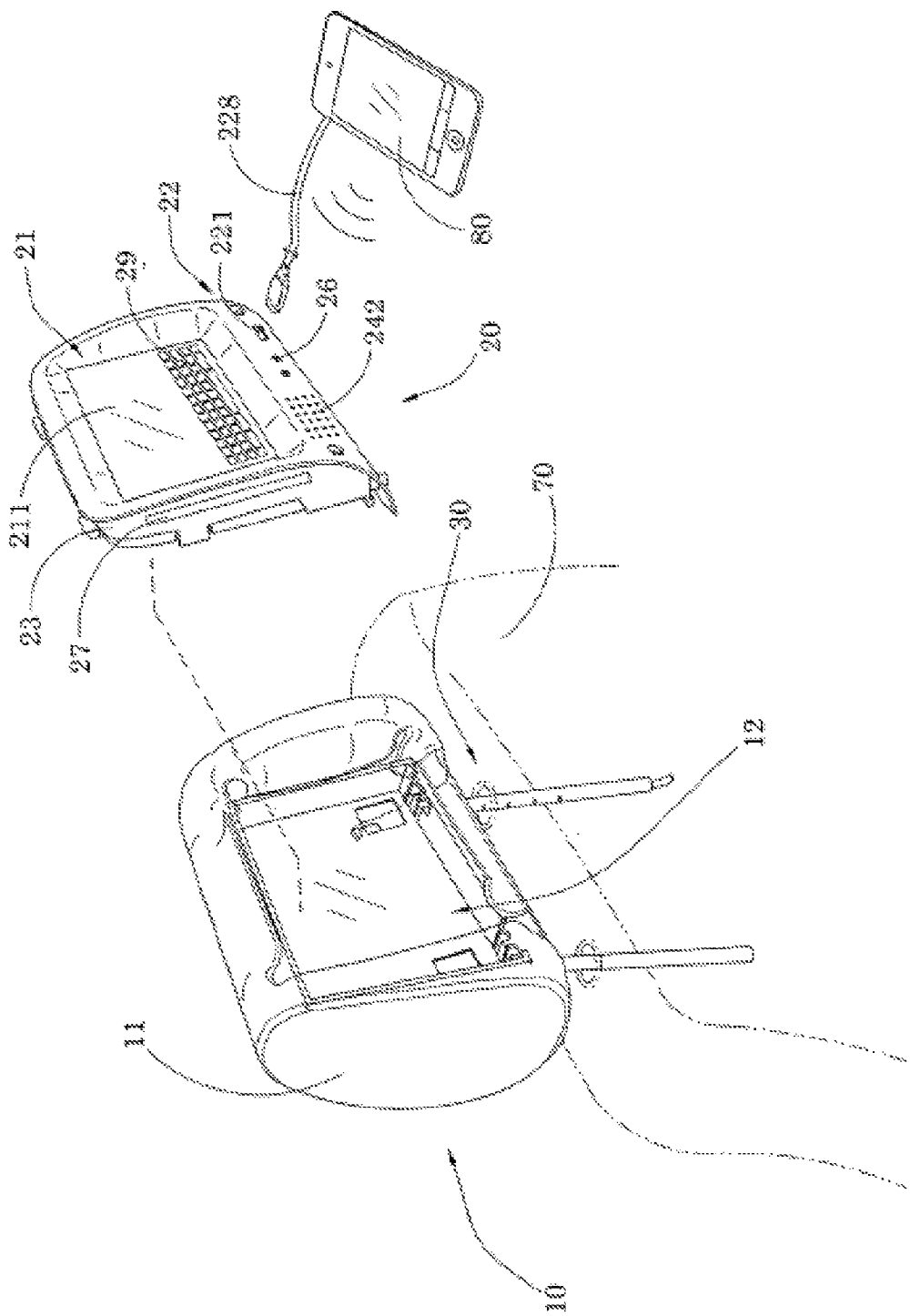
FIG. 2 is an illustration of one embodiment of the in-vehicle display for audio-video distribution configured for a headrest and shows a media player as the external electronic device.

FIG. 2 is an illustration of one embodiment of the in-vehicle display for audio-video distribution configured for a headrest and shows a media player as the external electronic device. In this example, the user may connect the external electronic device 80, such as an iPod® Touch®, or other media player with music, image and video files, and stream the content wirelessly to the entertainment system 20 via the communication tool 22 (i.e., the personal area network module 223, echo display module 229, or the USB connection port 221). The playback control of the multimedia material may be accomplished through the touch screen of the display screen 21, so that the external electronic device 80 may remain in the user's pocket.

EXAMPLE 2

Figure 3:
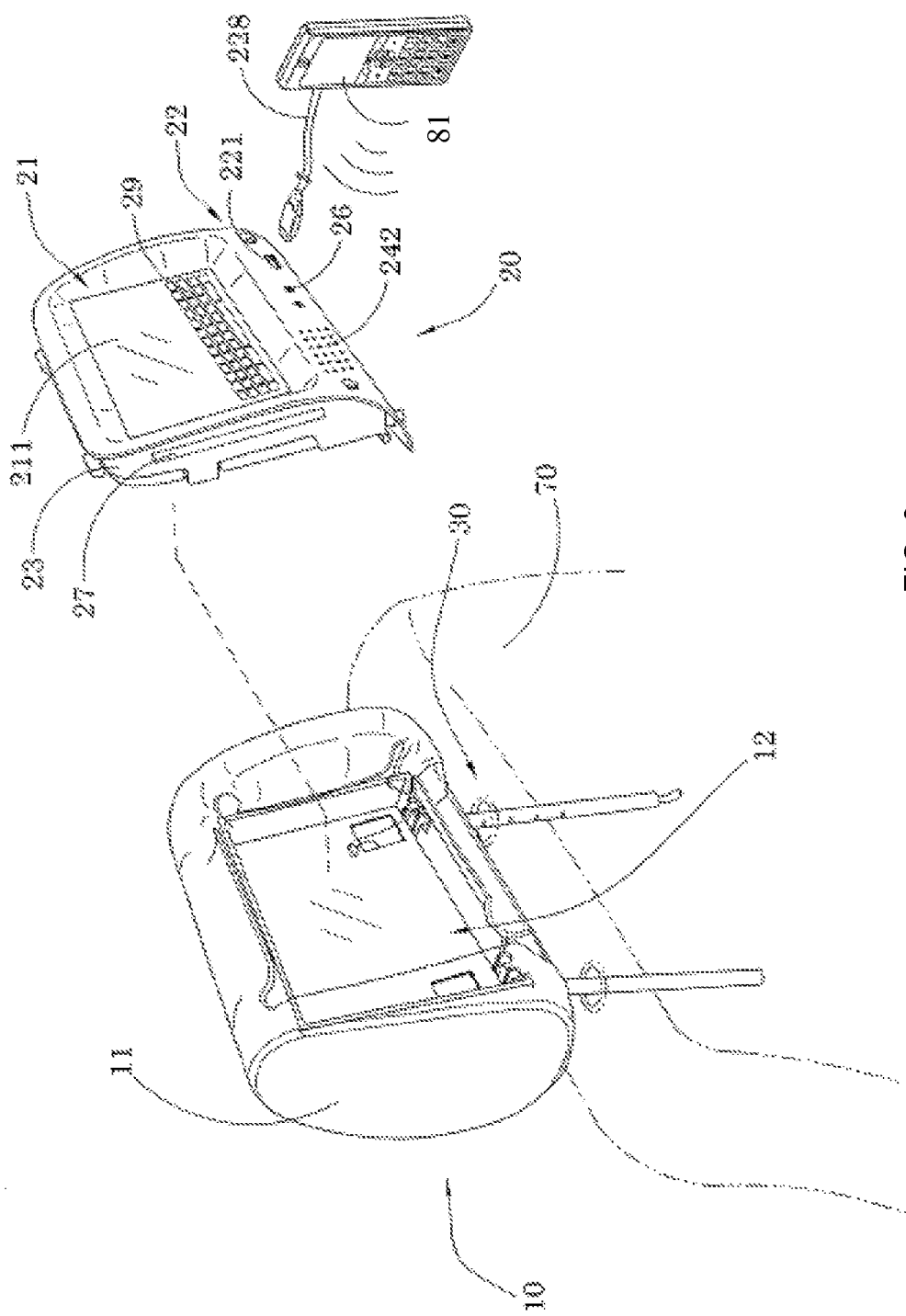
FIG. 3 is an illustration of one embodiment of the in-vehicle display for audio-video distribution configured for a headrest and shows a smartphone as the external electronic device.

FIG. 3 is an illustration of one embodiment of the in-vehicle display for audio-video distribution configured for a headrest and shows a smartphone as the external electronic device. In this example, the user may connect the external electronic device 81, such as a smartphone to the entertainment system 20 via the communication tool 22 (e.g., the personal area network module 221, echo display module 229, or the USB connection port 221), so that incoming or outgoing calls may be placed through the entertainment system 20. The user may make the calls by touching the LCD panel 211 of the display screen 21. Moreover, the user may achieve conversation with the other party by speaking through the microphone 26 and listening to the conversation of the other party through the stereo system 24.

In this particular example, the calling control may be accomplished through the LCD panel 211 (which has a touch-screen feature) so that the smartphone may be kept in the user's pocket. This generally provides great convenience to the user. Furthermore, the information displayed on the smartphone may be transferred to the LCD panel 211, so that the user may be able to access the display of the smartphone by simply looking at the LCD panel 211. For example, emails or text messages may be displayed on the LCD panel 211, which may also provide the control panel for controlling an operation of the smart phone.

EXAMPLE 3

Figure 4:
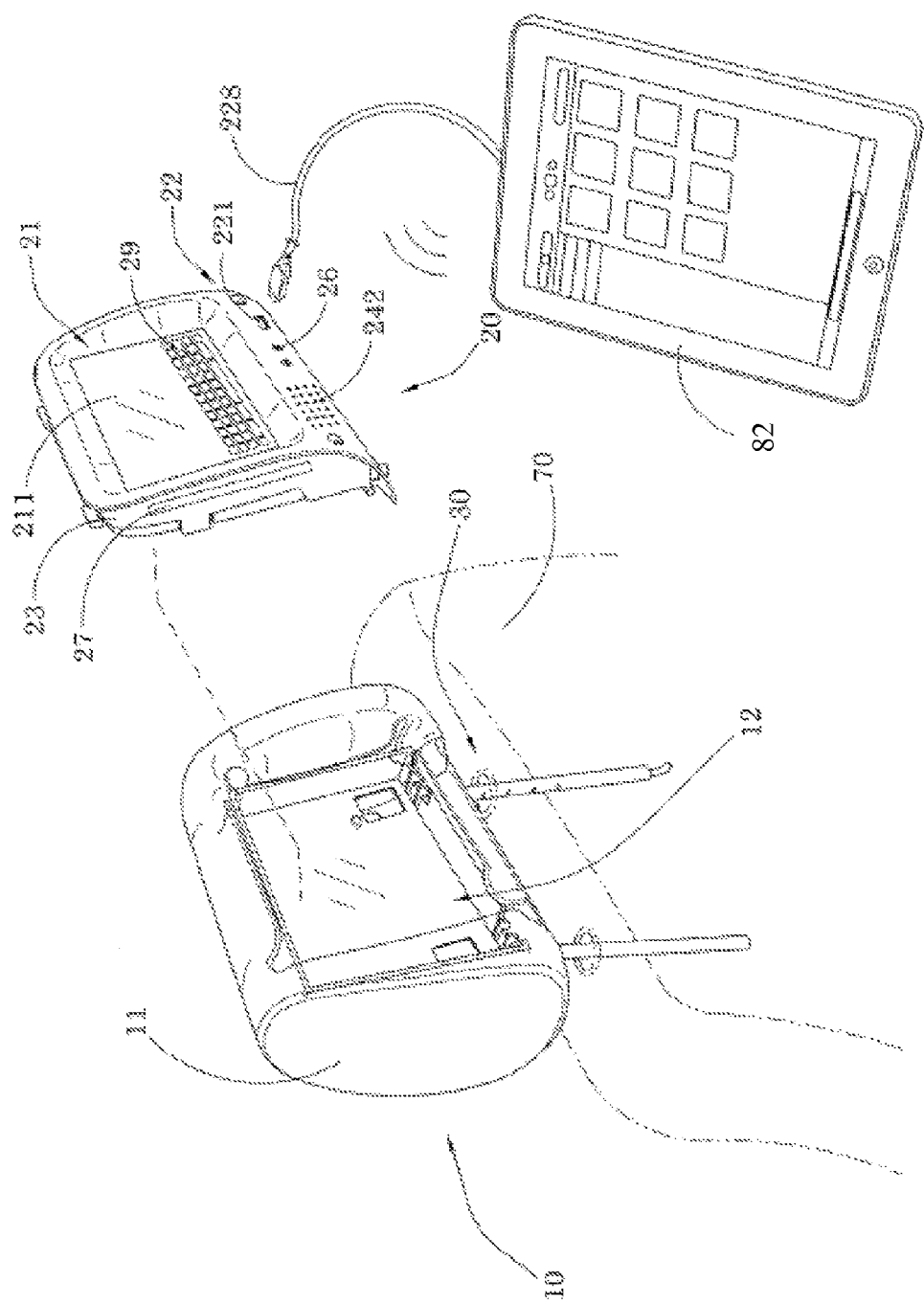
FIG. 4 is an illustration of one embodiment of the in-vehicle display for audio-video distribution configured for a headrest and shows a tablet computer as the external electronic device.

FIG. 4 is an illustration of one embodiment of the in-vehicle display for audio-video distribution configured for a headrest and shows a tablet computer as the external electronic device. In this particular example, the user may connect the external electronic device 82, such as a tablet computer to the entertainment system 20 via the communication tool 22 (e.g., the personal area network module 223, echo display module 229, or the USB connection port 221), so that the user may interact with the tablet computer through the entertainment system 20. Moreover, the display screen 21 may act as a second screen for some software applications, such as gaming.

EXAMPLE 4

Figure 5:
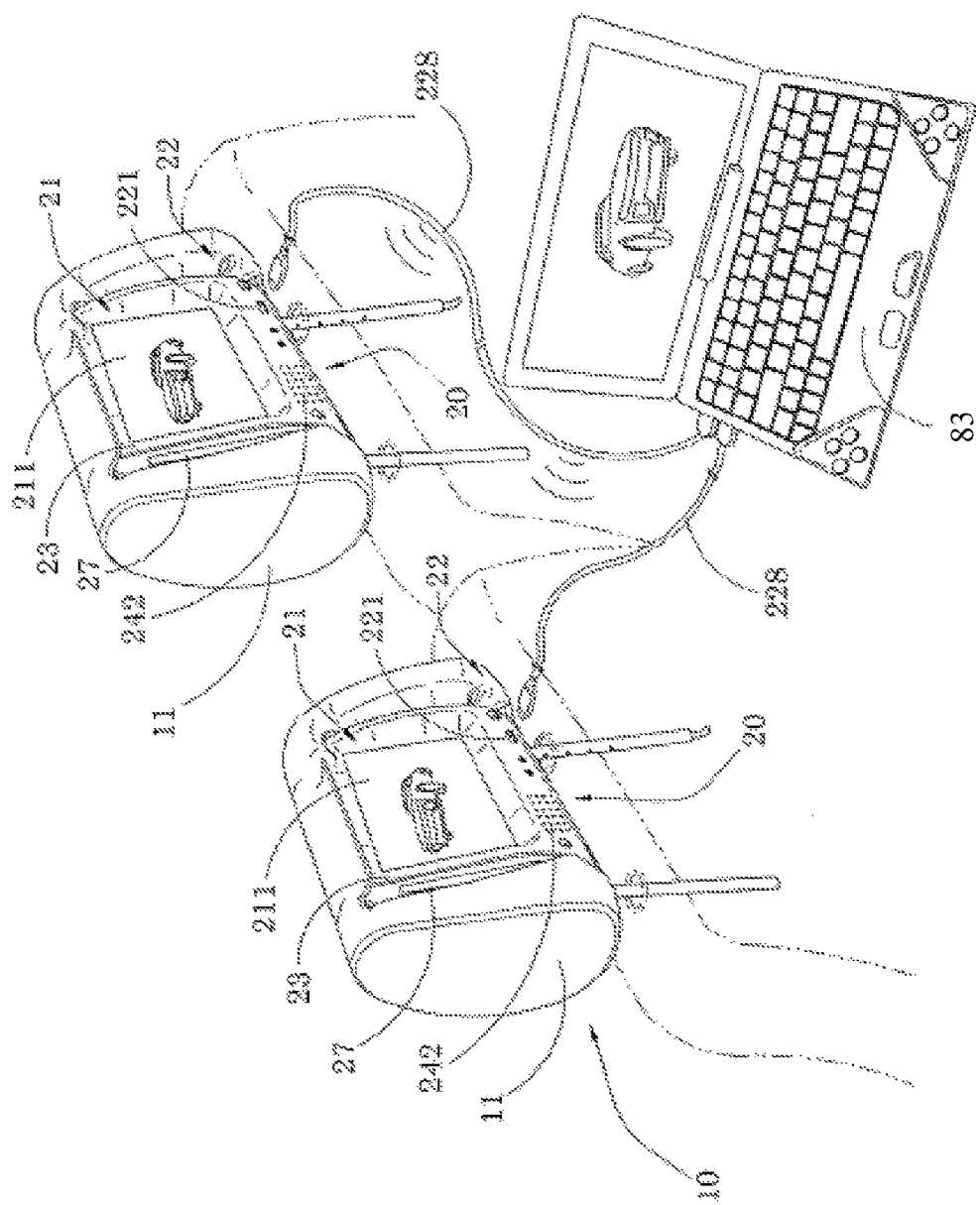
FIG. 5 is an illustration of one embodiment of the in-vehicle display for audio-video distribution configured for a headrest and shows a laptop computer as the external electronic device.

FIG. 5 is an illustration of one embodiment of the in-vehicle display for audio-video distribution configured for a headrest and shows a laptop computer as the external electronic device. In this example, the external electronic device 83 may be a laptop computer. The user may connect the laptop computer to the entertainment system 20 via communication tool 22 (e.g., the personal area network module 223, echo display module 229, or USB connection port 221). After connection, the user may perform a number of applications, such as a presentation. For example, the user may transfer presentation files and information to the entertainment system 20, which may then display the presentation information on the display screen 21. Moreover, several entertainment systems 20 of several headrests may be linked together through the communication tool 22 so that a single laptop computer may provide presentation material to many display screens 21 in the vehicle. Thus, the user may publish information stored in his or her laptop computer to many different people through the entertainment system 20 while traveling.

In general, the vehicle may be equipped with a plurality of headrests, while the entertainment systems 20 of the headrests may be wirelessly linked together by the communication tool 22 so that when one of the headrests receives information contained in the external electronic device 80, 81, 82, 83, other entertainment systems 20 of other headrests in the same vehicle may receive the information through communication among different entertainment systems 20. Moreover, each of the entertainment systems 20 may also control the external electronic device 80, 81, 82, 83 through the control panel 29. Moreover, a single external electronic device 80, 81, 82, 83 may be connected with a plurality of headrests.

In-Vehicle Display Configured for a Roof of a Vehicle

Referring to FIGS. 6 to 10, other embodiments of the in-vehicle display may be configured to attach to the roof interior of a vehicle. As shown in FIGS. 6 to 9, one embodiment of in-vehicle display 300 may comprise: a mounting arrangement 330 and an entertainment system 320, wherein the entertainment system 320 may comprise: a display screen 321, communication tool 322, housing 323, built-in multimedia player 327, control panel 329, and a USB connection port 3221. Although FIGS. 6 to 9 do not disclose a microphone, stereo speakers, memory card reader, and HDMI port, these components may also be included as part of the in-vehicle display 300 without deviating from the scope of the disclosure.

The mounting arrangement 330 may be any structure and fastener(s) used for installation and attachment of the in-vehicle display 300 to the roof of the vehicle and may include mounting brackets and screws. The entertainment system 320 is generally the media center device that supports digital content such as video, photo, music playback, and software functionality of the built-in media player and external electronic devices, as disclosed herein. The display screen 321 is generally the electronic output device used for the visual presentation of digital content. The communication tool 322 may be electrically connected with the display screen 321, and may be configured to electrically communicate with an external electronic device 80, 81, 82, 83 such that the communication tool 322 may electrically link the display screen 321 with the external electronic device 80, 81, 82, 83 for establishing an interaction between the display screen 321 and the external electronic device 80, 81, 82, 83. Thus, a user may be able to operate and control the external electronic device 80, 81, 82, 83 on the display screen 321 through the communication tool 322. The housing 323 may be the rigid casing that encloses and protects the components of the in-vehicle display 300.

The control panel 329 may be electrically connected with the central processing module 28 (shown in FIG. 10) for control of the various components mentioned above and to provide a platform for allowing the user to interact with the external electronic device 80, 81, 82, 83. The control panel 329 may be a physical control panel separately extended from the housing 323 or may be incorporated into the display screen 321 as a touch-screen feature for controlling the entertainment system 320 or the external electronic device 80, 81, 82, 83. Alternatively, the user may control the operation of the external electronic device 80, 81, 82, 83 through its own control panel.

In a preferred embodiment, the external electronic device 80, 81, 82, 83 wirelessly connects to the entertainment system 320 via one or more connection modules. For example, the echo display module 229 may enable wireless delivery of audio and video to or from an external electronic device 80, 81, 82, 83 such as tablets, mobile phones, and other devices and may allow users to, for example, echo a display from the external electronic device 80, 81, 82, 83 onto the display screen 321 in real-time, and watch live programs on the display screen. Thus, when the entertainment system 20 is connected to the external electronic device 80, 81, 82, 83, for example via Miracast®, a mirror image of the digital content may be displayed in the external electronic device 80, 81, 82, 83.

In addition to the Miracast® technology, the operation of the illustrative embodiments for an in-vehicle display configured for a roof of a vehicle may be elaborated under the following examples by illustrating the use of a different external electronic device 80, 81, 82, 83 and by referring to FIGS. 6 to 9.

EXAMPLE 5

Figure 6:
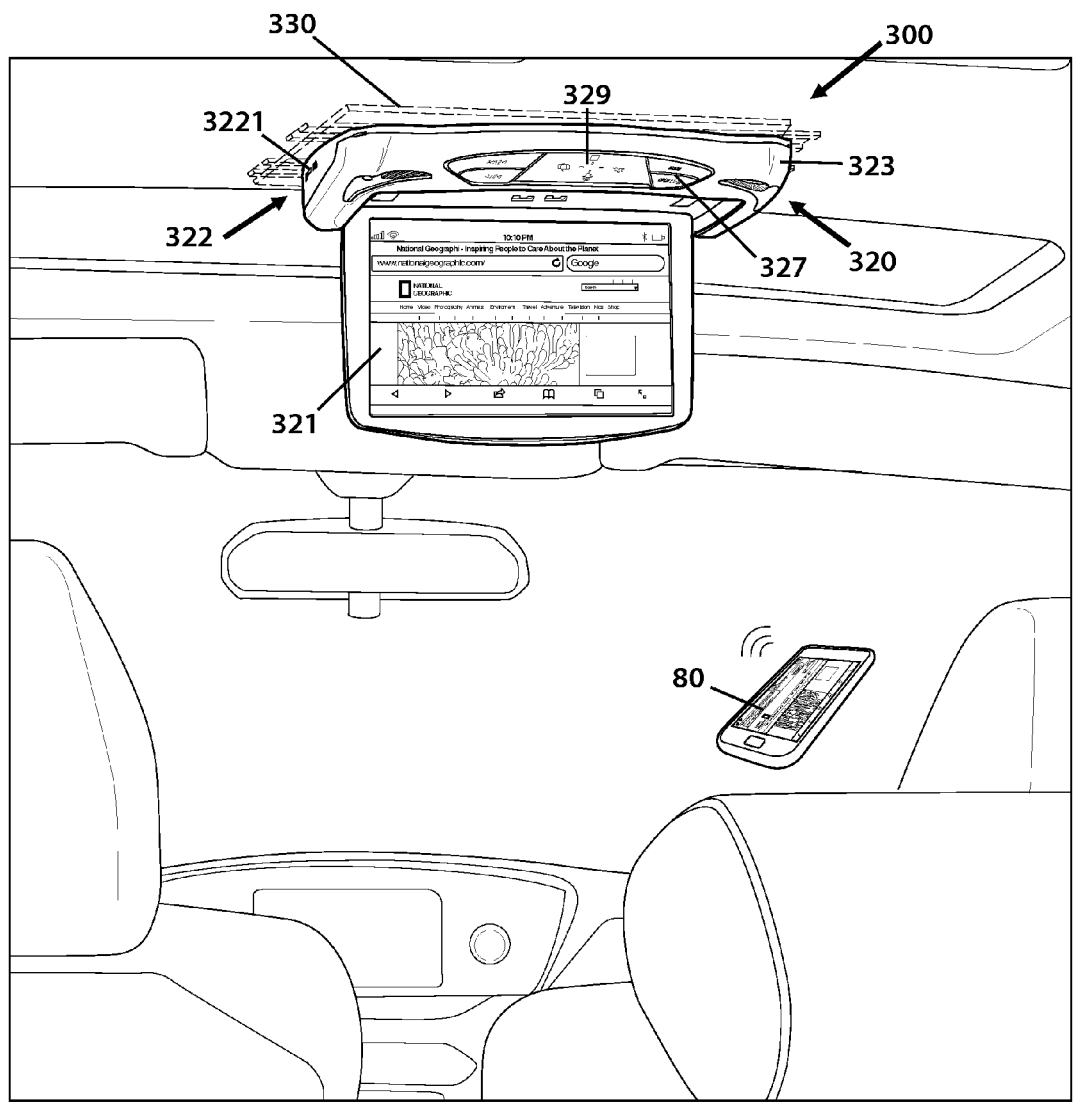
FIG. 6 is an illustration of one embodiment of the in-vehicle display for audio-video distribution configured to attach to a roof interior of a vehicle and shows a media player as the external electronic device.

FIG. 6 is an illustration of one embodiment of the in-vehicle display for audio-video distribution configured to attach to a roof interior of a vehicle and shows a media player as the external electronic device. In this example, the user may connect the external electronic device 80, such as an iPod® Touch®, or other media player with music, image and video files, and stream the content wirelessly to the entertainment system 320 via the communication tool 322 (e.g., personal area network module 223, wireless local area module 222, broadband wireless access module 224, echo display module 229, USB connection port 321, HDMI connection port). The playback control of the multimedia material may be accomplished through the touch screen of the display screen 321, so that the external electronic device 80 may remain in the user's pocket.

EXAMPLE 6

Figure 7:
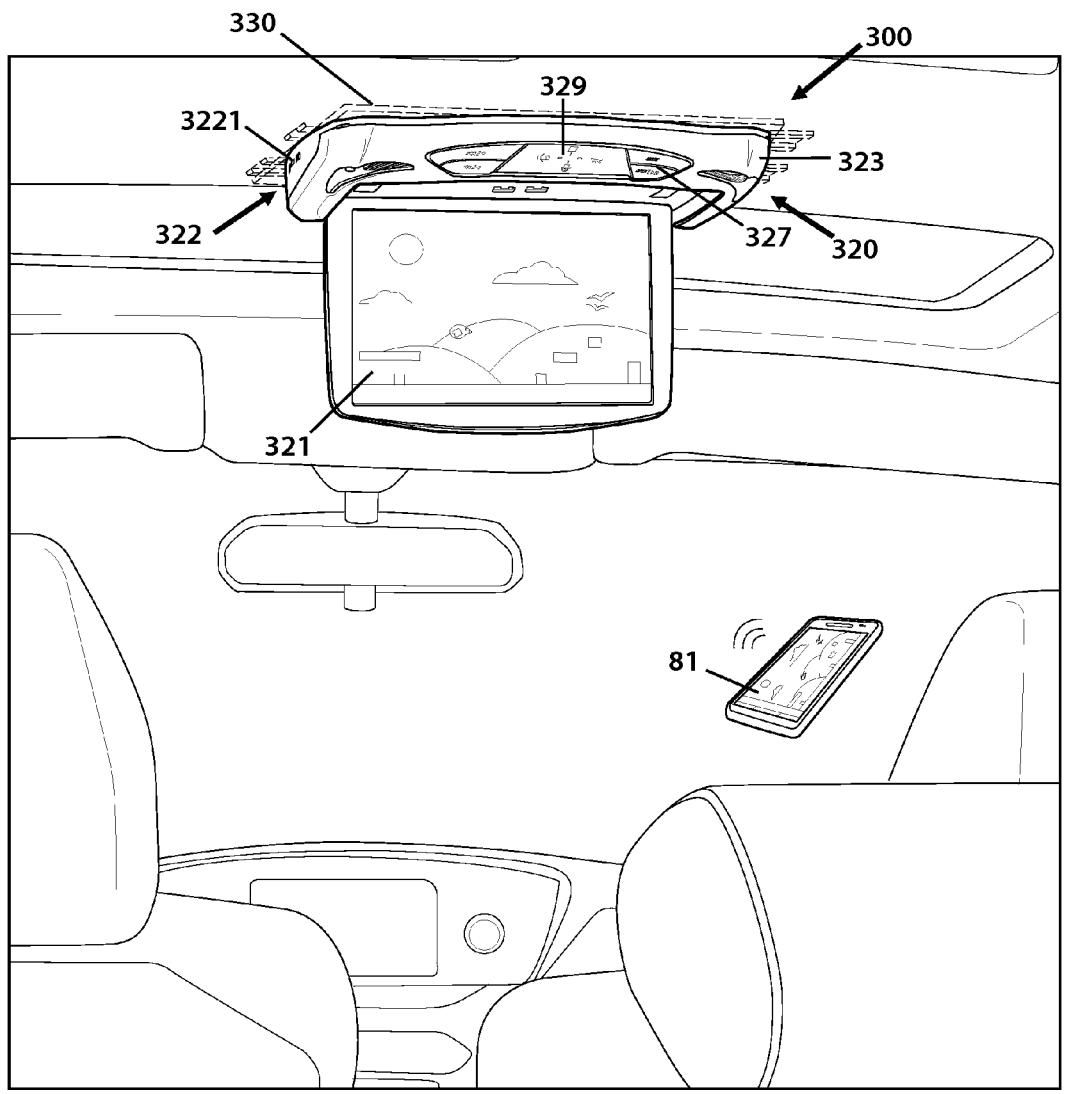
FIG. 7 is an illustration of one embodiment of the in-vehicle display for audio-video distribution configured to attach to a roof interior of a vehicle and shows a smartphone as the external electronic device.

FIG. 7 is an illustration of one embodiment of the in-vehicle display for audio-video distribution configured to attach to a roof interior of a vehicle and shows a smartphone as the external electronic device. In this example, the user may connect the external electronic device 81, such as a smartphone to the entertainment system 20 via the communication tool 322 (e.g., personal area network module 223, wireless local area module 222, broadband wireless access module 224, echo display module 229, USB connection port 321, HDMI connection port), such that incoming or outgoing calls may be placed through the entertainment system 320. The user may make the calls by touching the display screen 321 or the smartphone itself. Moreover, the user may achieve conversation with the other party by speaking through a microphone installed in the vehicle or in-vehicle display 300 and listening to the conversation of the other party through the stereo system 24 of the vehicle or in-vehicle display 300.

In this particular example, the calling control may be accomplished through the display screen 321 (which may have a touch-screen feature) so that the smartphone external electronic device 81 may be kept in the user's pocket. This generally provides great convenience to the user. Furthermore, the information displayed on the smartphone external electronic device 81 may be transferred to the display screen 321, so that the user may be able to access the display of the smartphone external electronic device 81 by simply looking at the display screen 321. For example, emails or text messages may be displayed on the display screen 321, which may also provide the control panel for controlling an operation of the smart phone.

EXAMPLE 7

Figure 8:
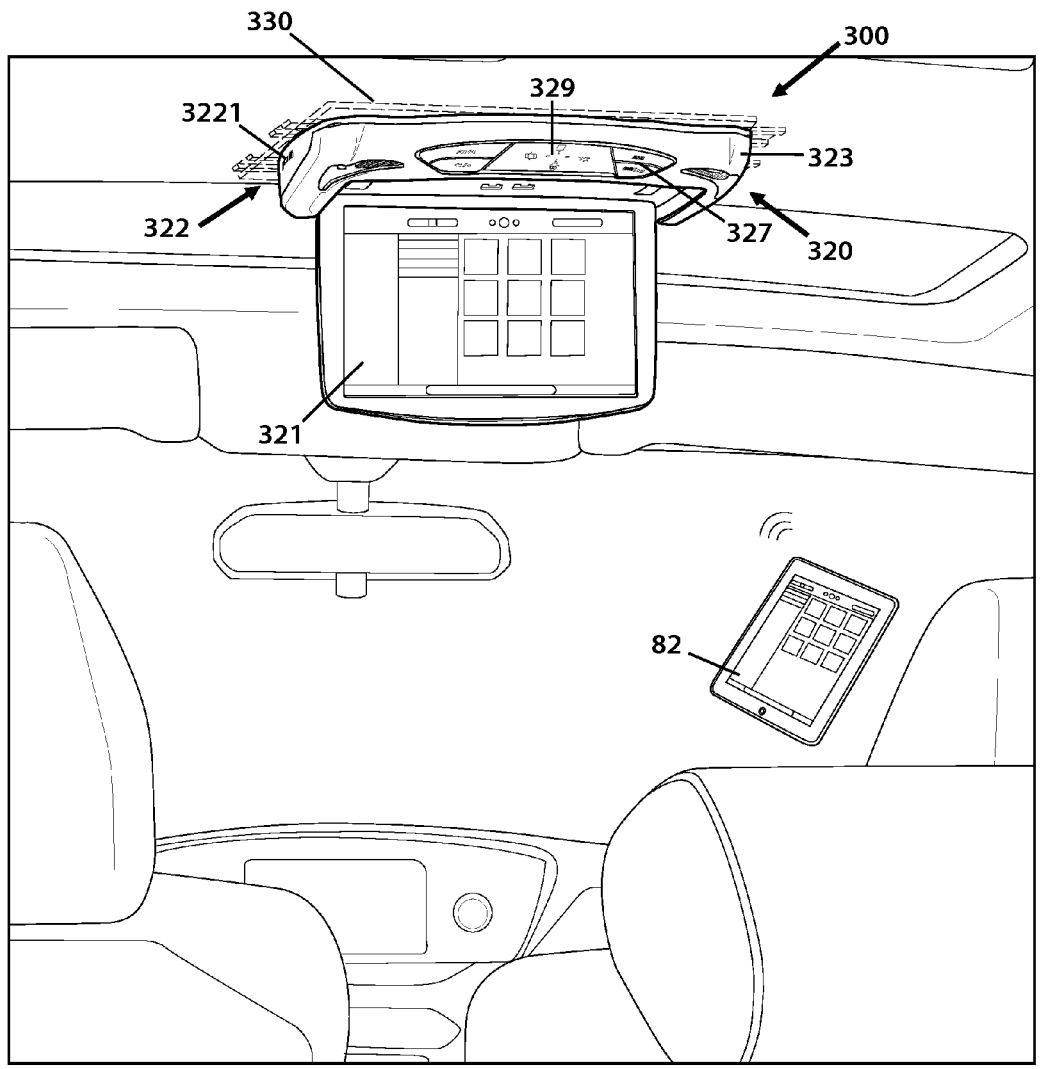
FIG. 8 is an illustration of one embodiment of the in-vehicle display for audio-video distribution configured to attach to a roof interior of a vehicle and shows a tablet computer as the external electronic device.

FIG. 8 is an illustration of one embodiment of the in-vehicle display for audio-video distribution configured to attach to a roof interior of a vehicle and shows a tablet computer as the external electronic device. In this particular example, the external electronic device 82 may be an iPad® or other type of tablet computer so that the user may interact with the iPad® or other tablet computer through the entertainment system 320. Moreover, the display screen 321 may act as a second screen for some iPad® applications, such as gaming.

EXAMPLE 8

Figure 9:
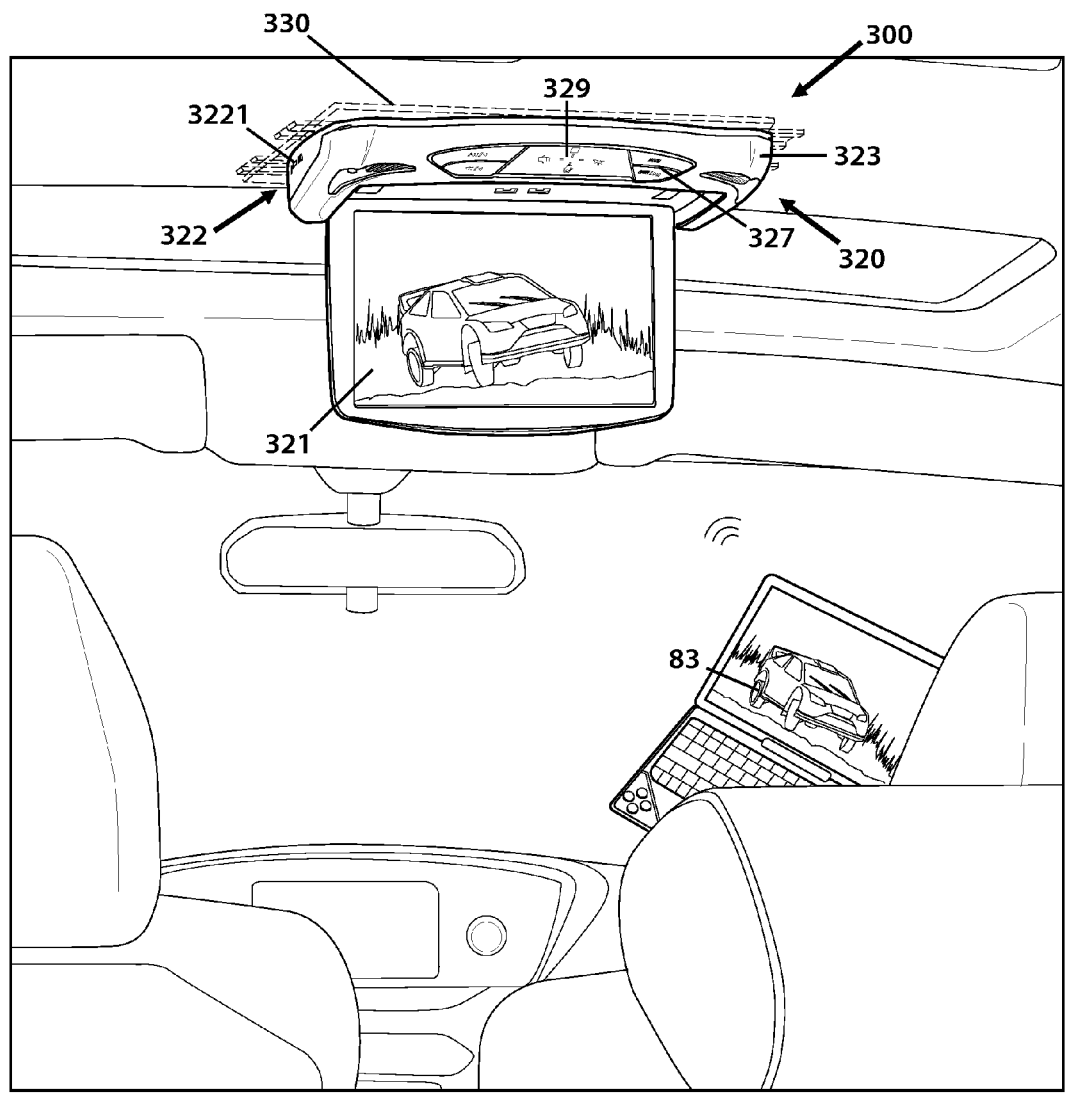
FIG. 9 is an illustration of one embodiment of the in-vehicle display for audio-video distribution configured to attach to a roof interior of a vehicle and shows a laptop computer as the external electronic device.

FIG. 9 is an illustration of one embodiment of the in-vehicle display for audio-video distribution configured to attach to a roof interior of a vehicle and shows a laptop as the external electronic device. In this example, the external electronic device 83 may be a laptop computer. The user may connect the laptop computer to the entertainment system 320 via the communication tool 322 (e.g., personal area network module 223, wireless local area module 222, broadband wireless access module 224, echo display module 229, USB connection port 321, HDMI connection port). After connection, the user may perform a number of applications, such as presentation. For example, the user may transfer presentation files and information to the entertainment system 320 which may then display the presentation information on the display screen 321. Moreover, several entertainment systems 320 within the vehicle may be linked together through the communication tool 322 such that a single laptop computer may provide presentation material to many display screens 321 in the vehicle. Thus, the user may publish information stored in his or her laptop computer to many different people through the entertainment system 320 while traveling.

Although FIGS. 6 to 9 only show a single in-vehicle display for a roof of a vehicle, the vehicle may be equipped with a plurality of in-vehicle displays, while the entertainment systems 320 of the in-vehicle displays 300 may be wirelessly linked together by the communication tool 322, so that when one of the in-vehicle displays receives information contained in the external electronic device 80, 81, 82, 83, other entertainment systems 320 of other in-vehicle displays in the same vehicle may receive the information through communication among different entertainment systems 320. Moreover, each of the entertainment systems 320 may also control the external electronic device 80, 81, 82, 83 through the control panel 329. Moreover, a single external electronic device 80, 81, 82, 83 may be connected with a plurality of in-vehicle displays.

Figure 10:
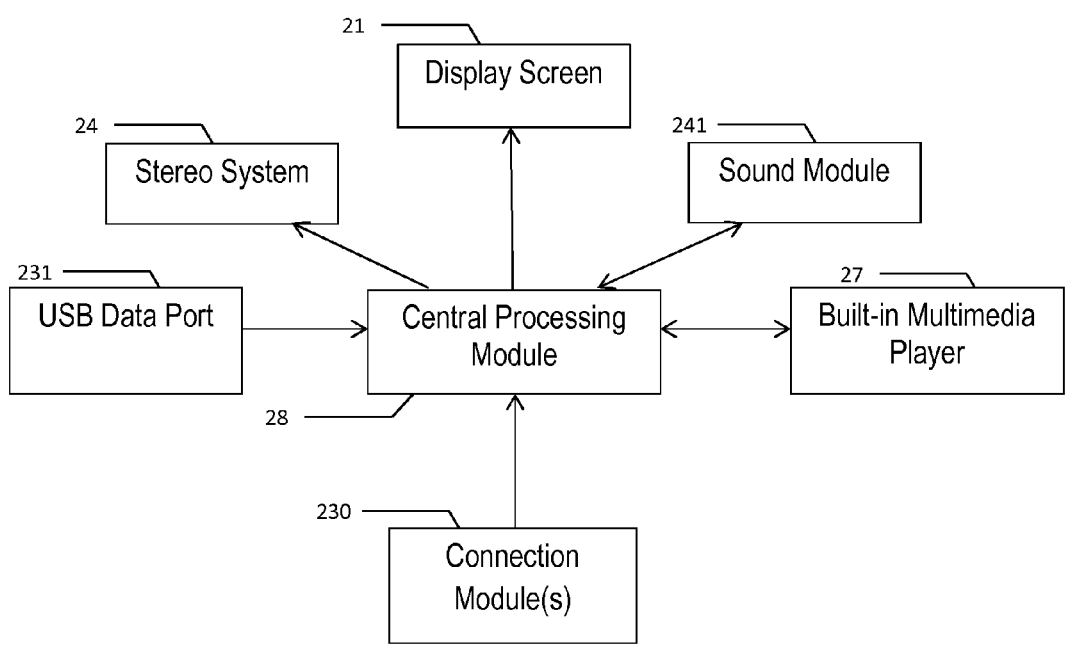
FIG. 10 is a block diagram of a preferred embodiment of the in-vehicle display for audio-video distribution configured to attach to a roof interior of a vehicle.

FIG. 10 is a block diagram of a preferred embodiment of the in-vehicle display for audio-video distribution configured to attach to a roof interior of a vehicle. As shown in FIG. 10, a preferred embodiment of the in-vehicle display may comprise: a display screen 21, stereo system 24, built-in multimedia player 27, central processing module 28, connection modules 230, and USB data port 231, sound module 241. As discussed above, the display screen 21 may be any electronic output device for the visual presentation of digital content and may utilize various screen technologies such liquid crystal display (LCD), light emitting diode (LED), thin-film transistor (TFT), and the like. The display screen 21 may also be a touch screen with touch sensitive controls and may comprise an LED backlit panel for exceptional picture quality, high efficiency, and long life. In one embodiment, the display screen 21 may be a 13.3" digital panel or 10.1" digital panel with LED backlighting.

The stereo system 24 is generally any audio device for audio presentation. The built-in multimedia player 27 is generally a device used to process multi-media devices for the entertainment system. The central processing module 28 is generally any hardware or component that carries out the instructions of a computer program or software application for other components of the in-vehicle display, such as the display screen 21, stereo system 24, sound module 241, and other connection modules. Further, the sound module 241 may be configured to generate audible sound and utilize automatic loudness control (ALC) technology to address typical loudness problems, including audio jumps between programs and commercials, without adversely impacting the program content. The connection modules 230 may be any set of components and/or software instructions configured to wirelessly connect the entertainment system to the Internet, such that the user is able to access to the Internet through the entertainment system. The personal area network module 230 also may be configured to mirror or echo the digital content displayed on the external electronic device of the user to the display of the entertainment system. Embodiments of the connection modules may be Bluetooth®, Miracast®, WiMax®, and WiFi® technology.

The in-vehicle display configured for a roof of a vehicle may also comprise other components such as 3.5 mm audio jacks for headphones, A/V inputs (e.g., RCA input), infrared (IR) transmitters, stereo speakers, an HDMI port, DVD player, USB port, and SD media card.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the invention as claimed.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent to the public, regardless of whether it is or is not recited in the claims.

What is claimed is:

1. An in-vehicle display system for audio-video distribution, comprising:
    a first mounting arrangement;
    a second mounting arrangement;
    a first entertainment system; and
    a second entertainment system;
    wherein said first entertainment system and said second entertainment system each comprise: a housing, at least one display screen, a communication tool, and one or more connection modules;
    wherein said first mounting arrangement is configured to mount said housing of said first entertainment system to an interior portion of a vehicle;
    wherein said second mounting arrangement is configured to mount said housing of said second entertainment system to a vehicle headrest;
    wherein said one or more connection modules are located within said communication tools of said first entertainment system and said second entertainment system;
    wherein said communication tools are electrically coupled to said at least one display screens of said first entertainment system and said second entertainment system;
    wherein said communication tool of said first entertainment system is configured to communicate with one or more external electronic devices of a user via said one or more connection modules, such that said communication tool of said first entertainment system links said at least one display screens of said first entertainment system with said one or more external electronic devices in order to establish an interaction between said at least one display screen of said first entertainment system and said one or more external electronic devices, such that said user is able to operate and control a digital content displayed on said at least one display screen of said first entertainment system through said one or more external electronic devices;
    wherein said one or more connection modules of said first entertainment system and said second entertainment system comprise an echo display module;
    wherein said echo display module is configured to wirelessly mirror said digital content displayed on said one or more external electronic devices of said user to said at least one display screen of said first entertainment system or said at least one display screen of said second entertainment system, such that said digital content displayed on said one or more external electronic devices is shared and displayed simultaneously on one of said at least one display screens of said first entertainment system and said second entertainment system without utilizing a physical connection between said one or more external electronic devices and said first entertainment system and said second entertainment system;
    wherein said first entertainment system is configured to wirelessly connect to said second entertainment system, such that, when said at least one display screen of said first entertainment system mirrors said digital content displayed by said external electronic device, said at least one display screen of said second entertainment system also mirrors said digital content displayed on said at least one display screen of said first entertainment system; and
    wherein said in-vehicle display system is configured to allow said user to wirelessly operate and control said digital content of said one or more external electronic devices by interacting with said at least one display screens of said first entertainment system and said second entertainment system when said digital content is mirrored on said one or more external electronic devices and said at least one display screens via said echo display module.

2. The in-vehicle display system, recited in claim 1, wherein said one or more connection modules comprise a wireless local area network module;
   wherein said wireless local area network module is configured to wirelessly connect said first entertainment system and said second entertainment system to an Internet.

3. The in-vehicle display system, recited in claim 1, wherein said one or more connection modules comprise a broadband wireless access module; and
   wherein said broadband wireless access module is configured to wirelessly connect said first entertainment system and said second entertainment system to a high speed Internet.

4. The in-vehicle display system, recited in claim 1, wherein said one or more connection modules comprise a wireless personal area network module; and
   wherein said wireless personal area network module is configured to wirelessly connect said external electronic device to said first entertainment system or said second entertainment system, such that said user is able to exchange data between said external electronic device and said first entertainment system or said second entertainment system.

5. The in-vehicle display system, recited in claim 1, wherein said communication tool of said first entertainment system comprises at least one universal serial bus connection port; and
   wherein said at least one universal serial bus connection port is configured to facilitate said physical connection between said external electronic device and said first entertainment system via said one or more connection modules.

6. The in-vehicle display system, recited in claim 1, wherein said first entertainment system further comprises a built-in multimedia player; and
   wherein said built-in multimedia player is configured to process and play a multimedia material on said at least one display screen of said first entertainment system.

7. The in-vehicle display system, recited in claim 1, wherein said first entertainment system further comprises a storage device;
   wherein said storage device comprises a predetermined amount of storage capacity for storing said digital content.

8. The in-vehicle display system, recited in claim 1, wherein said interior portion of said vehicle is a roof interior;
   wherein said at least one display screen of said first entertainment system is an overhead flip-down monitor; and
   wherein said overhead flip-down monitor is configured to attach to said roof interior of said vehicle.

9. The in-vehicle display system, recited in claim 1, wherein said first entertainment system further comprises a control panel;
   wherein said control panel is configured to allow said user to input one or more commands to control said first entertainment system, said communication tool of said first entertainment system, and said external electronic device; and
   wherein said control panel is configured to mirror said digital content displayed on said external electronic device of said user to said at least one display of said first entertainment system.

10. An in-vehicle display system for audio-video distribution, comprising:
    a first mounting arrangement;
    a second mounting arrangement;
    a first entertainment system; and
    a second entertainment system;
    wherein said first entertainment system and said second entertainment system each comprise a housing, at least one display screen, a communication tool, and one or more connection modules;
    wherein said first mounting arrangement is configured to mount said housing of said first entertainment system to a first vehicle headrest;
    wherein said second mounting arrangement is configured to mount said housing of said second entertainment system to a second vehicle headrest;
    wherein said one or more connection modules are located within said communication tools of said first entertainment system and said second entertainment system;
    wherein said communication tools are electrically coupled to said at least one display screens of said first entertainment system and said second entertainment system;
    wherein said communication tool of said first entertainment system is configured to communicate with an external electronic device of a user via said one or more connection modules, such that said communication tool of said first entertainment system wirelessly links said at least one display screen of said first entertainment system with said external electronic device in order to establish an interaction between said at least one display screen of said first entertainment system and said external electronic device, such that said user is able to operate and control a digital content displayed on said at least one display screen of said first entertainment system through said external electronic device;
    wherein said one or more connection modules of said first entertainment system and said second entertainment system comprise an echo display module;
    wherein said echo display module is configured to wirelessly mirror said digital content displayed on said external electronic device of said user to said at least one display screen of said first entertainment system or said at least one display screen of said second entertainment system, such that said digital content displayed on said electronic device is shared and displayed simultaneously on said at least one display screens of said first entertainment system and said second entertainment system without utilizing a physical connection between said external electronic device and said first entertainment system and said second entertainment system;
    wherein said first entertainment system is configured to wirelessly connect to said second entertainment system, such that, when at least one display screen of said first entertainment system mirrors said digital content displayed by said external electronic device, said at least one display screen of said second entertainment system also mirrors said digital content displayed on said at least one display screen of said first entertainment system; and
    wherein said in-vehicle display system is configured to allow said user to wirelessly operate and control said digital content of said external electronic device by interacting with said at least one display screens of said first entertainment system and said second entertainment system when said digital content is mirrored on said external electronic device and said at least one display screens via said echo display module.

11. The in-vehicle display system recited in claim 10, wherein said one or more connection modules comprises: a wireless local area network module, a broadband wireless access module, and wireless personal area network module;
   wherein said wireless local area network module is configured to wirelessly connect said entertainment system to an Internet;
   wherein said broadband wireless access module is configured to wirelessly connect said entertainment system to a high speed Internet; and
   wherein said wireless personal area network module is configured to wirelessly connect said external electronic device to said first entertainment system or said second entertainment system, such that said user is able to exchange data between said external electronic device and said first entertainment system or said second entertainment system.

12. The in-vehicle display, recited in Claim 10, wherein said first entertainment system further comprises a control panel;
   wherein said control panel is configured to allow said user to input one or more commands to control said first entertainment system, said communication tool of said first entertainment system, and said external electronic device; and
   wherein said control panel is configured mirror said digital content from said external electronic device to said at least one display screen of said first entertainment system.

13. The in-vehicle display system, recited in claim 12, wherein said at least one display screen of said first entertainment system is a touch-screen; and
   wherein said touch-screen is configured to allow said user to control said control panel of said first entertainment system and said external electronic device by touching predetermined positions on said display screen.

14. The in-vehicle display system, recited in claim 10, wherein said communication tool of said first entertainment system comprises at least one universal serial bus connection port; and
   wherein said at least one universal serial bus connection port is configured to facilitate said physical connection between said external electronic device and said first entertainment system via said one or more connection modules.

15. The in-vehicle display system, recited in claim 10, wherein said first entertainment system further comprises a built-in multimedia player; and
   wherein said built-in multimedia player is configured to process and play a multimedia material on said at least one display screen of said first entertainment system.

16. The in-vehicle display, recited in claim 10, wherein said first entertainment system further comprises a storage device;
   wherein said storage device comprises a predetermined amount of storage capacity for storing said digital content.

17. An in-vehicle display system for audio-video distribution, comprising:
   a first mounting arrangement;
   a second mounting arrangement;
   a first entertainment system; and
   a second entertainment system;
   wherein said first entertainment system and said second entertainment system, each comprise: a housing, at least one display screen, a communication tool, one or more connection modules, a control panel, a built in multimedia player, and a storage device;
   wherein said first mounting arrangement is configured to mount said housing of said first entertainment system to a first vehicle headrest;
   wherein said second mounting arrangement is configured to mount said housing of said second entertainment system to a second vehicle headrest;
   wherein said one or more connection modules are located in said communication tools of said first entertainment system and said second entertainment system;
   wherein said communication tools are electrically coupled to said at least one display screen;
   wherein said communication tool of said first entertainment system is configured to communicate with an external electronic device of a user via said one or more connection modules, such that said communication tool of said first entertainment system links said at least one display screens of said first entertainment system with said external electronic device in order to establish an interaction between said at least one display screen of said first entertainment system and said external electronic device, such that said user is able to operate and control a digital content on said at least one display screen of said first entertainment system through said external electronic device;
   wherein said one or more connection modules of said first entertainment system and said second entertainment system comprise: an echo display module, a wireless local area network module, a broadband wireless access module, and a wireless personal area network module;
   wherein said echo display module is configured to wirelessly mirror said digital content displayed on said one or more external electronic devices of said user to said at least one display screen of said first entertainment system or said at least one display screen of said second entertainment system, such that said digital content displayed on said external electronic device is shared and displayed simultaneously on said at least one display screens of said first entertainment system and said second entertainment system without utilizing a physical connection between said external electronic device and said first entertainment system and said second entertainment system;
   wherein said first entertainment system is configured to wirelessly connect to said second entertainment system, such that, when said at least one display screen of said first entertainment system mirrors said digital content displayed by said external electronic device, said at least one display screen of said second entertainment system also mirrors said digital content displayed on said at least one display screen of said first entertainment system;
   wherein said in-vehicle display system is configured to allow said user to wirelessly operate and control said digital content of said external electronic devices by interacting with said at least one display screens of said first entertainment system and said second entertainment system when said digital content is mirrored on said external electronic device and said at least one display screens via said echo display module;
   wherein said wireless local area network module is configured to wirelessly connect said first entertainment system and said second entertainment system to an Internet;

wherein said broadband wireless access module is configured to wirelessly connect said first entertainment system and said second entertainment system to a high speed Internet;

wherein said wireless personal area network module is configured to wirelessly connect said external electronic device to said first entertainment system or said second entertainment system, such that said user is able to exchange data between said external electronic device and said first entertainment system or said second entertainment system;

wherein said control panel is configured to allow said user to input one or more commands to control said first entertainment system, said communication tool of said first entertainment system, and said external electronic device;

wherein said at least one display screens of said first entertainment system and said second entertainment system are a touch-screen;

wherein said touch-screens are configured to allow said user to control said control panel of said first entertainment system and said external electronic device by touching predetermined positions on said at least one display screen;

wherein said communication tool of said first entertainment system comprises at least one universal serial bus connection port;

wherein said at least one universal serial bus connection port is configured to facilitate a physical connection between said external electronic device and said first entertainment system via said one or more connection modules;

wherein said built-in multimedia player is configured to process and play a multimedia material on said at least one display screens;

wherein said storage device comprises a predetermined amount of storage capacity for storing said digital content.

* * * * *